M. SMITHEY.
METER.
APPLICATION FILED DEC. 11, 1915.

1,195,161.

Patented Aug. 15, 1916.
3 SHEETS—SHEET 1.

WITNESSES:
E. N. Callaghan
W. E. Beck

INVENTOR
MARVIN SMITHEY,
BY
ATTORNEYS

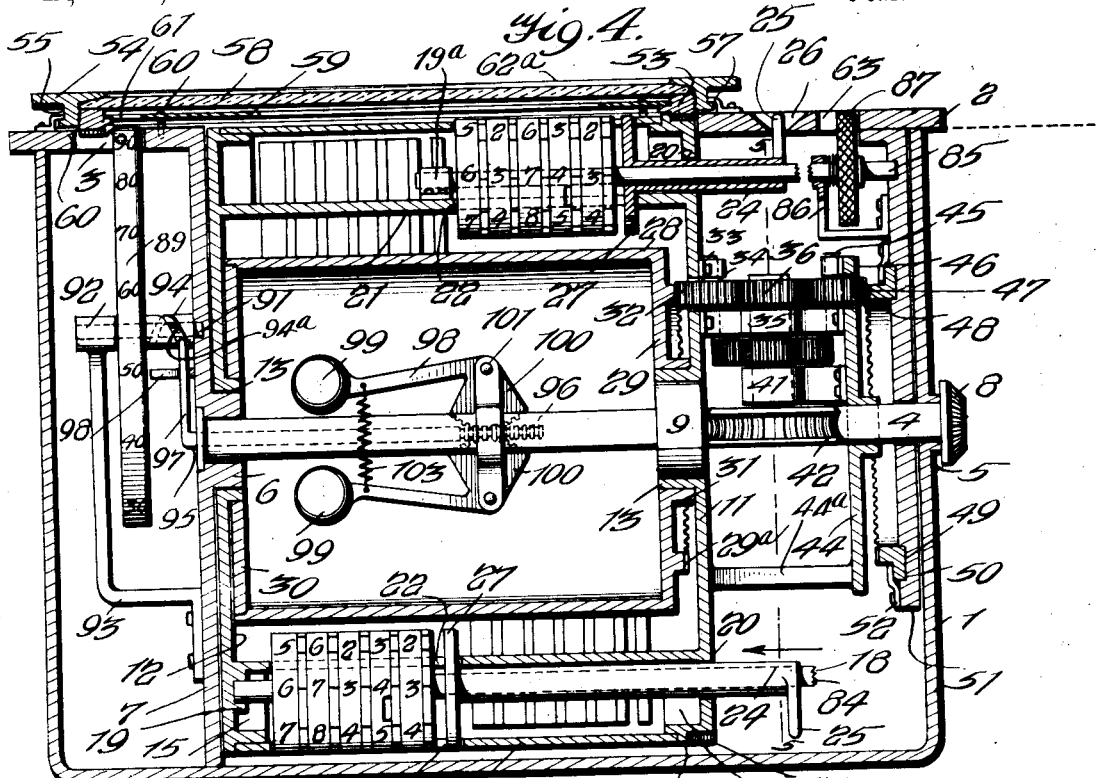
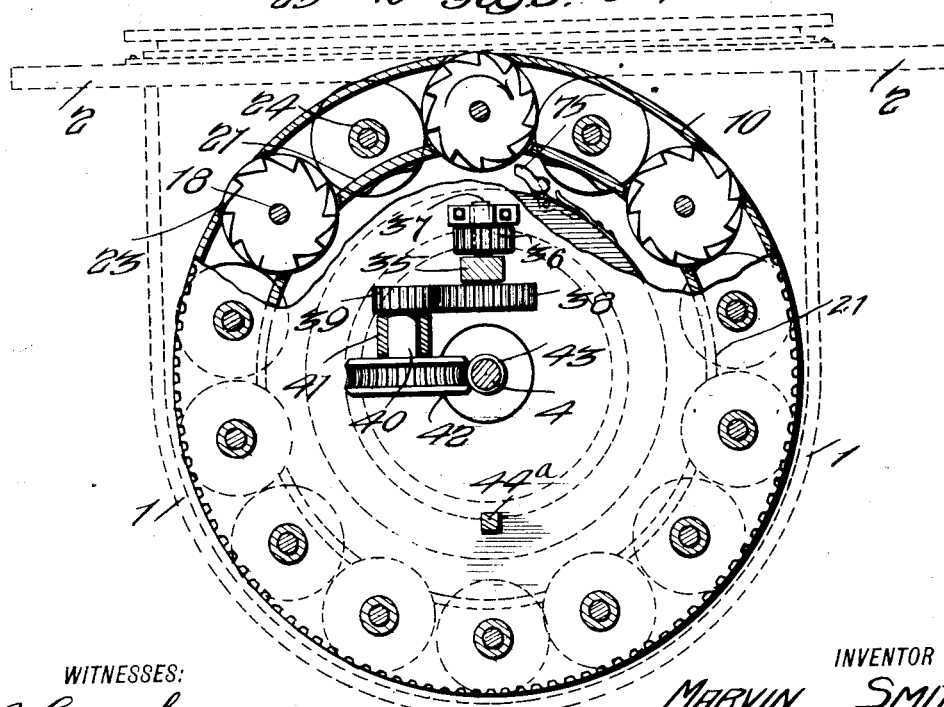

M. SMITHEY.
METER.
APPLICATION FILED DEC. 11, 1915.

1,195,161.  Patented Aug. 15, 1916.
3 SHEETS—SHEET 3.

WITNESSES:
E. W. Callaghan
H. E. Beck

INVENTOR
MARVIN SMITHEY,
BY Munn &co.
ATTORNEYS

UNITED STATES PATENT OFFICE.

MARVIN SMITHEY, OF LAWRENCEVILLE, VIRGINIA.

METER.

1,195,161.   Specification of Letters Patent.   Patented Aug. 15, 1916.

Application filed December 11, 1915. Serial No. 66,288.   REISSUED

*To all whom it may concern:*

Be it known that I, MARVIN SMITHEY, a citizen of the United States, and a resident of Lawrenceville, in the county of Brunswick and State of Virginia, have invented a new and useful Improvement in Meters, of which the following is a specification.

My invention is an improvement in meters, and the invention has for its object to provide a device of the character specified adapted for use with motor vehicles, wherein a combined speed indicator and a series of distance traveled registers are provided, and wherein the registers are mounted on a rotatable support to move with the support, and wherein operating mechanism is provided within the support for actuating the registers in succession, and wherein the support is arranged to be rotated at regular intervals to bring the registers in succession to reading position, and wherein other manually operating mechanism is provided for bringing any predetermined register into reading position and having identifying mechanism operated by the movement of the manually operated moving means for identifying the speedometers as they appear in reading position, and wherein mechanism is provided for engagement by the several registers when they are in reading position for throwing the said registers out of operation and for resetting the registers.

Figure 1:
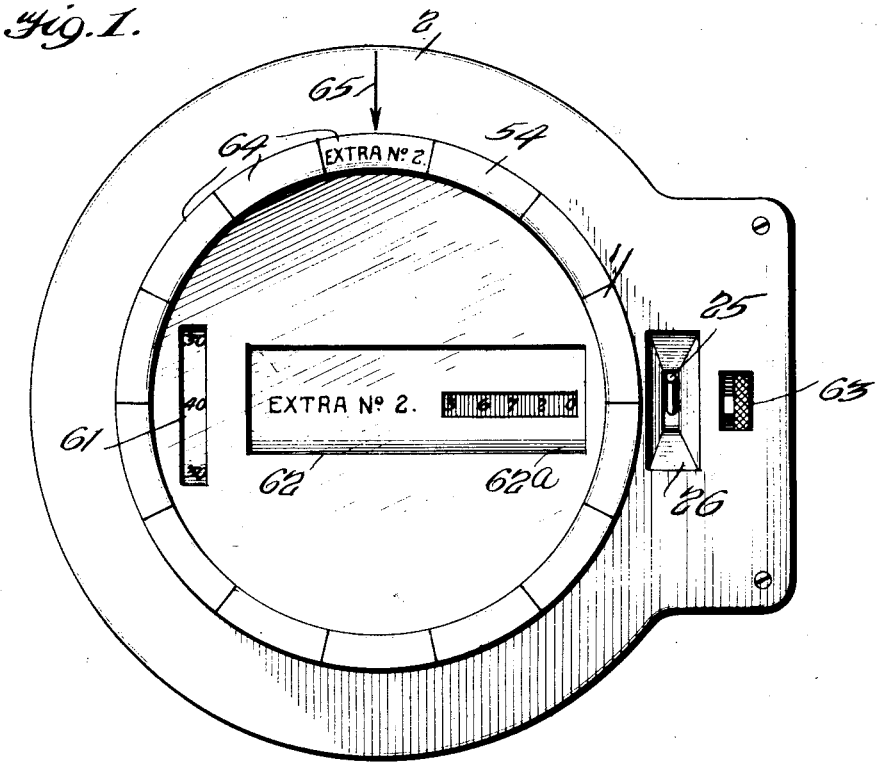
Figure 2:
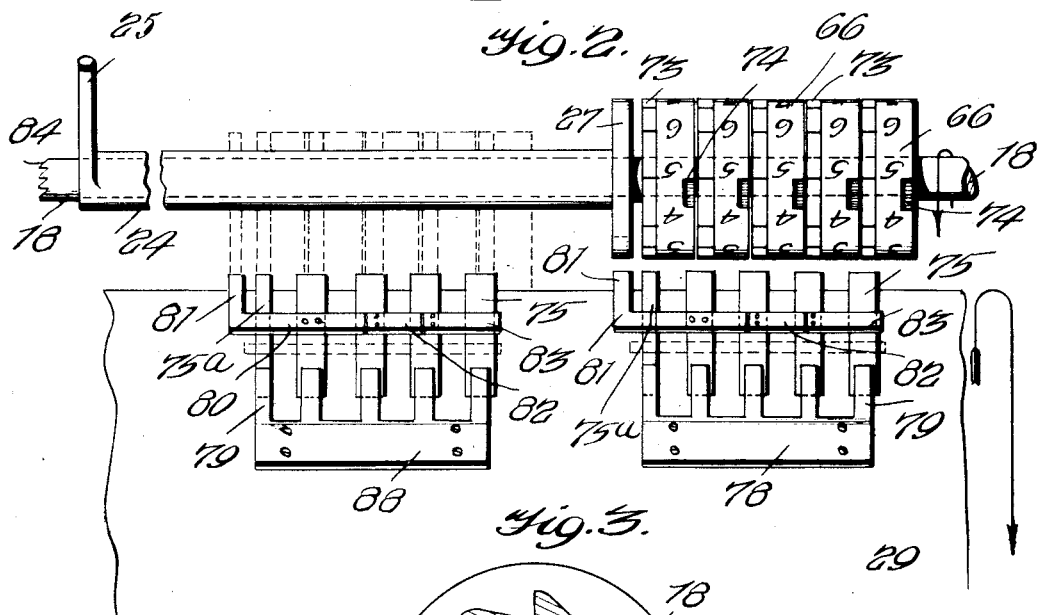
Figure 3:
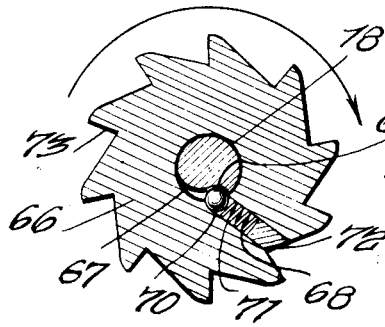
Figure 6:
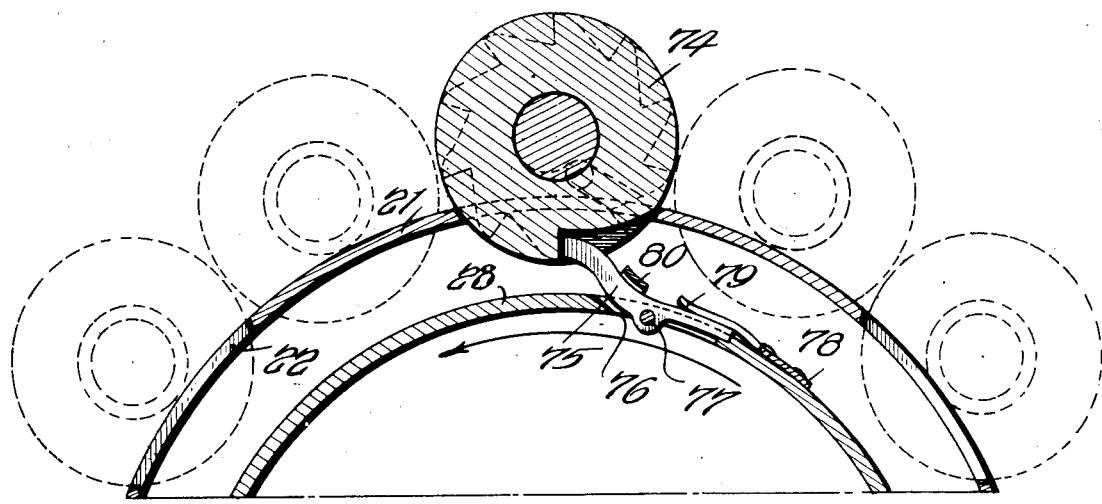
Figure 7:
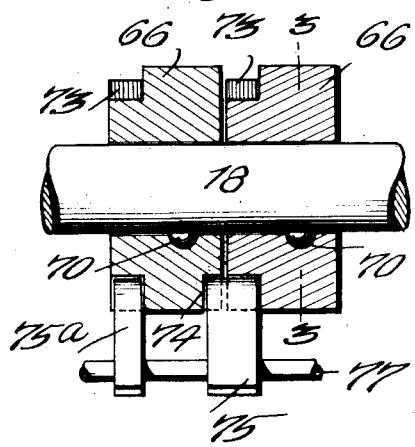
Figure 8:
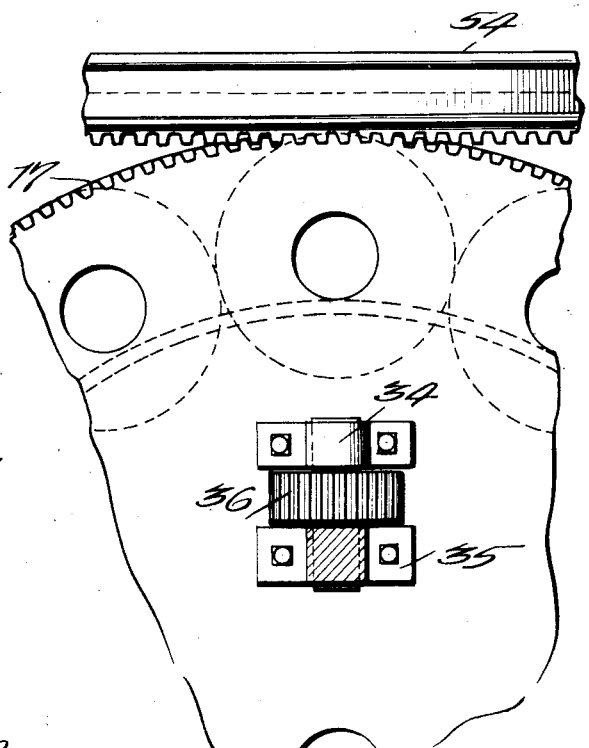
Figure 9:
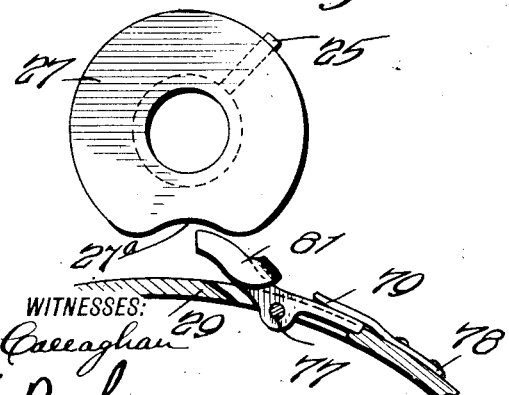

In the drawings:—Figure 1 is a front view of the improved meter, Fig. 2 is an enlarged detail showing one of the number wheels and the mechanism for operating the same, Fig. 3 is a section on the line 3—3 of Fig. 7, Fig. 4 is a longitudinal section, Fig. 5 is a section on the line 5—5 of Fig. 4, looking in the direction of the arrows adjacent to the line, Fig. 6 is an enlarged section taken substantially on the line 6—6 of Fig. 2, Fig. 7 is a section on the line 7—7 of Fig. 6, Fig. 8 is a detail of the manually operating means for turning the number wheel support, and Fig. 9 is a detail showing the mechanism for releasing the number wheels from the operating mechanism.

In the present embodiment of the invention a casing is provided consisting of an approximately U-shaped body 1 and a covering plate 2, and the said plate 2 is plane and is provided with openings arranged on a line diametrical of the plate. This plate 2 as shown in Fig. 1 is approximately circular and the said plate is provided with a circular opening 3 through which the registering mechanism may be seen.

A shaft 4 is journaled in bearings 5 in one end of the casing body 1 and in bearings 6 a transverse partition 7 near the opposite end, and the said shaft is hollow as shown, and is provided outside of the casing with a bevel gear wheel 8 for connection with a flexible shaft or the like, to connect the shaft 4 with one of the wheels of the vehicle to operate the said shaft. The shaft 4 has a cylindrical enlargement or head 9 intermediate its ends, and the said enlargement 9 is of the same diameter as the hub or bearing 6 in the partition 7.

A substantially cylindrical support comprising a body 10 and ends 11 and 12 is journaled on the enlargement 9, and the hub or bearing 6 of the partition 7, the heads 11 and 12 having hubs 13 which fit over the enlargement and over the bearing. The head 11 has an inwardly extending continuous flange or rib 14 on its inner face and the head 12 has a similar flange 15, and these flanges 14 and 15 fit within the adjacent ends of the body 10 of the odometer support.

The flange 14 does not extend entirely within the body, the said flange or rib having an external continuous radial rib 16 spaced apart from the outer face of the head and the adjacent end of the body 1 fits against this rib 16. The support has an annular series of gear teeth 17 between the rib 16 and the outer face of the head and operating mechanism for rotating the cylindrical support 10—11—12 engages the teeth 17.

A number of odometers or registering devices is supported by the said support, the said odometers being similar and being arranged in two series, one series at each end of the cylindrical support, and the members of one series are staggered with respect to the members of the other series. That is, the members of one series alternate with the members of the other series. Each of the said odometers or registering devices, to be later described in detail, is mounted on a shaft 18 which is supported in a manner to be presently described. The odometers as before stated, are arranged in two series, one of the series being at one end of the cylindrical support and the other series being at the opposite end.

Each odometer is supported by a shaft 18, and these shafts are alike, differing only in length. The shafts 18 pertaining to the series of odometers at the end of the support adjacent to the head 12 are journaled at their inner ends in bearings 19 on the inner face of the head 11, and the shafts 18 pertaining to the other series of odometers, that is, the series adjacent to the head 12 are journaled at their inner ends in bearings $19^a$ on a cylindrical web to be later described. The shafts 18 of both series of odometers extend through openings 20 in the head 11 and the shafts are thus supported by the head 11 and by the bearings 19 and $19^a$.

The cylindrical partition or web 21 before mentioned is arranged within the support 10—11—12 and coaxial with the said support and this web has an opening 22 at each odometer through which a portion of the odometer extends as shown in Figs. 4 and 5. The body 10 of the cylindrical support is provided with an opening 23 in radial register with each opening 22, and a portion of the odometer at the adjacent opening 22 extends through the opening 23.

A sleeve 24 encircles each shaft 18 within the opening 20 of the head 11, and each of the said sleeves has a radial arm 25 at its outer end which is adapted to extend through an opening 26 in the head or cover 2 under conditions to be later described.

Each of the sleeves 24 is provided at its inner end with a disk 27, and each of the disks 27 is in effect a component part of the adjacent odometer. The sleeves 18 are alike except as to length, the difference in length of the sleeves as well as the difference in length of the shafts 18 being due to the arrangement of the odometers in series at the ends of the cylindrical support. The cylindrical support 10—11—12 is rotatable on the shaft 4 and within the web 21 the operating mechanism for the odometers is mounted. This operating means comprises a drum consisting of a cylindrical body 28, an integral head 29 and a head 30 which is threaded into the end of the body as shown in Fig. 4. The head 30 has a central opening which fits over the inwardly extending hub 13 of the head 12 and the head 29 has a hub 31 which fits over the hub 13 of the head 11. Thus the drum is mounted for rotation on the hubs 13 of the heads 11 and 12.

The head 29 of the drum has an annular series of gear teeth $29^a$ on its outer face and coaxial with the drum and these teeth are engaged by the teeth of a pinion 32, secured to a stub shaft 33, which is journaled at its outer end in a bearing 34 and at its lower end in a bearing bracket 35 to be later described, and the said pinion 32 extends through a slot in the head 11 into engagement with the teeth $29^a$.

The pinion 32 meshes with a second pinion 36 on a stub shaft 37 which is journaled in the bearing bracket 35 before mentioned and the stub shaft 36 is provided at its lower end with a pinion 38 which meshes with a pinion 39 on a third stub shaft 40, journaled in a bearing bracket 31, and the shaft 40 is provided at its lower end with a worm wheel 42, which meshes with a worm 43 on the shaft 4 before mentioned.

A plate 44 is connected with the head 11 in spaced relation and on the opposite side of the worm wheel 42 from the said head 11, by means of the bearing bracket 35 before mentioned, and an arm $44^a$ at the opposite side of the shaft from the bearing bracket 35. A stub shaft 45 is journaled in a bearing 46 at its upper end on the plate 44 and in the bearing bracket 35 at its lower end, and the said shaft 45 has a pinion 47 meshing with the pinion 36 at the opposite side from the point engaged by the pinion 32.

The pinion 32 extends through a slot in the head 11 into engagement with the teeth $29^a$, and the pinion 47 extends through a similar slot in the plate 44 into engagement with the teeth of a gear ring 48. This gear ring 48 has a marginal external flange 49 at the end remote from the teeth, and the ring and the flange at the said end are received in an annular groove 50 in a plate 51, which is rigid with the adjacent end of the casing 1. The gear ring 48 may move in the groove 50 rotatively with respect to the shaft 4 but it is held in the groove frictionally by spring plates 52, which are secured to the plate 51. These plates 52 extend over the flange 49 and normally hold the ring 48 from movement in the groove.

When the shaft 4 is rotated the worm wheel 42 will be rotated and the said wheel through the pinion 39 and the shaft 40 will rotate the pinions 32 and 47. The pinion 32 meshing with the teeth $29^a$ of the drum will rotate the drum while the teeth of the pinion 47 meshing with the teeth of the gear ring 48 will rotate the plate 44, the gear ring 48 being normally fixed, and since this plate 44 is rigidly connected with the cylindrical support for the odometers, the said support will also be rotated from the worm wheel 42.

The cylindrical support 10—11—12, the plate 43, and the gearing in connection with the stub shafts 33, 37, 40 and 45 move together when the cylindrical support is rotated through the gear wheel 47 and the gear ring 48, and the said cylindrical support and connected parts may also be rotated manually. This rotation is brought about through the series of teeth 17 on the flange 14 of the head 11. These teeth are engaged by the teeth of a gear ring 53, which is mounted within a ring 54, journaled on the plate 2 of the casing 1. This ring 54 has a continuous flange 55 on its inner face and the said flange has a marginal rib 56 at the edge remote from the ring 54.

Holding clips 57 are secured to the outer face of the plate 2 at the opening 3 and the said clips engage over the rib 56 of the ring 54 to prevent outward movement of the ring away from the cover 2. The ring 53 is threaded into the ring 54 and a disk 58 of transparent material, as for instance, glass, is held in the ring 54 between the said ring and the ring 53. The ring 54 is rotatable with respect to the cover 2, being held in place by the clips 57 and it is obvious that when the said ring 54 is rotated the cylindrical support and connected parts will also be rotated through the engagement of the teeth of the ring 53 with the teeth 17 of the head 11.

A thin plate 59 of metal is arranged over the opening 3 within the ring 53, the said plate being held to the plate 2 by means of screws 60 or the like. This plate 59 has an opening 61 through which the indications of the speedometer to be later described, may be read, and the plate is also provided with an elongated opening having ends 62—62$^a$ through which the indications of the two series of odometers may be read. These openings 61 and 62 and 62$^a$ are arranged on a diameter of the ring 54, and outside of the ring the opening 26 of the plate 2 is in the same line as is also an opening 63 outside of the opening 26.

When the cylindrical support is rotated through the gear ring 48 or through the rings 53 and 54 the odometers of the two series will be brought in succession into reading position at the openings 62. During the rotation of the cylindrical support, by either of the above methods specified, the odometers of the two series will be brought in alternation to the opposite ends 62 and 62$^a$ of the reading opening, the odometers of the series at the head 12 being read through one end 62, while the odometers of the series of the head 11 will be read through the other end 62$^a$.

It will be understood that the several odometers are identified with various elements of the vehicle. In the present instance there are fourteen (14) odometers, seven in each series, and ten of the odometers are identified with mileage of certain elements of the vehicle and with mileage of the vehicle itself. Of the ten, six are devoted to the tires, four to the tires in use on the wheels and two to the extra or additional tires, two of the ten are devoted to the fuel and oil supply, while the remaining two of the ten are devoted to the trip mileage and total or season mileage. The remaining four odometers are devoted to a different purpose, namely, the purpose of warning the driver that certain necessary operations about the machine should be attended to as for instance, oiling and greasing different parts. It is obvious however, that the arrangement of the odometers and their identification with parts of the vehicle may be varied in accordance with conditions or in accordance with the wishes of the purchaser.

When the shaft 4 is driven from one of the wheels of the vehicle in the usual manner the drum 28 which is the operating mechanism for the odometers will move or actuate the odometers in succession. Each mile that the car travels will cause it to turn to indicate such distance on each odometer and in succession. For every complete rotation of the drum each unit wheel of each odometer will be advanced a distance of one tooth to present the numeral 1 of the units wheel of each odometer in reading position with respect to the cylindrical support.

The driving mechanism between the worm wheel 42 and the gear ring 48 slowly rotates the cylindrical support and connected parts bringing the odometers in succession into reading position at 62 and 62$^a$ for every twenty miles traveled by the vehicle. That is, the cylindrical support is so geared and connected to the shaft 4 that it rotates slowly when the vehicle is moving and at such speed that for every twenty miles traveled by the vehicle the said cylindrical support will make a complete rotation about the shaft 4.

Any predetermined odometer may be brought into reading position at 62 and 62$^a$ by means of the ring 54. The operator grasps the edge of the ring and rotates it on the cover 2. The diameter of the gear ring 53 is equal to the diameter of the gear ring 17 and the teeth are similarly spaced so that the cylindrical support and the ring 54 move at precisely the same speed.

In my prior application, Serial No. 58808, filed Oct. 30, 1915, the identifying labels for the odometers are arranged on the periphery of the cylindrical support 10 adjacent to the odometers themselves. In the present instance however, the identifying labels 64 are arranged on the outer face of the ring 54, the said face of the ring being separated or divided into fourteen equal divisions by transverse lines as shown in Fig. 1, and the labels are arranged in the spaces between the lines.

An indicator or pointer 65 is provided on the plate 2 just above the openings 62 and 62$^a$ and this indicator or pointer coöperates with the labels to show which odometer is at reading position; for instance, in Fig. 1 the odometer identified with extra tire No. 2 is at the reading opening 62ª and the indicator 65 points at the extra tire No. 2 on the ring 54.

Since the ring 54 and the cylindrical support 10—11—12 move at the same speed and never vary their relative angular position with respect to each other whenever any label is at the indicator 65 the odometer pertaining thereto will be in reading position at the end 62 or at the end 62ª depending upon which series carries the said odometer.

The odometers are precisely alike in construction and similarly operated, each consisting of a series of wheels mounted on the shaft 18. Each odometer is composed of five number wheels and a disk and each of the said wheels is designed to be locked to the shaft by a ball clutch as shown more particularly in Figs. 2, 3 and 7. Each of the number wheels 66 has a central opening 67 for receiving the shaft 18, and each wheel is also provided with a substantially radial opening 68 leading from the central opening to the periphery of the wheel. The shaft 18 of each odometer has a recess or trough 69 at each wheel for engagement by the ball 70 of the said wheel, and each of the said recesses 69 as shown, is of greatest depth at one end and gradually decrease in depth toward the other end.

The ball 70 of each wheel is inserted into the recess 69 through the opening 68, and a coil spring 71 is arranged in each opening 68 between the ball and a plug 72 which fills the outer end of the opening 68 and which has its outer end flush with the periphery of the wheel. With this arrangement when the shaft 18 moves in the direction of the arrow shown in Fig. 3, the wheel will be carried therewith for the ball will engage between the deep end of the recess 69 and the opposite face of the opening 68. When however, the shaft turns in the opposite direction the inclined bottom of the groove or recess 69 will force the ball outwardly against the resistance of the spring and the shaft may turn freely without affecting the number wheel.

Each number wheel has at the face adjacent to the arm 25 of the sleeve 24 a series of ratchet teeth 73 and at the opposite face each wheel has a single notch or recess 74 arranged in a certain predetermined position with respect to the wheel. Each wheel is also provided on its peripheral surface with a series of numerals running from 0 to 9 and arranged successively in such manner that when the number wheel is rotated by the rotating mechanism the numerals on the wheel will be presented in succession at the slot or opening 23 of the cylindrical support 10—11—12.

The drum 28 before mentioned, is provided with an operating device for each series of odometers. Each of the said operating devices consists of five pawls 75—75ª, the said pawls being journaled in slots 76 in the periphery of the drum and the pawls of each series are journaled on a common shaft 77, which is supported by the drum. A species of comb is secured to the drum at each series of pawls, each of the said combs comprising a body plate 78 which is secured to the outer face of the drum, and a series of spring tongues 79 extending laterally from the body plate and each tongue overlies the end of the adjacent pawl remote from the odometer.

It will be noticed from an inspection of Figs. 2 and 7 that the pawl 75ª of the units wheel is of the same width as the width of the teeth 73 of the wheel. The pawls 75 of the tens, hundreds, thousands and ten thousands wheel are of greater width than the teeth, and since the number wheels are arranged alongside each other with the cylindrical peripheral surface of one adjacent to the teeth of the succeeding wheel and since the pawls 75 are of greater width than the teeth of the wheels to which they pertain it will be obvious that the said pawls 75 cannot enter between adjacent wheels to engage the teeth 73 of the wheel adjacent to the pawl. The pawl 75ª may engage the units wheel at all times except when all of the pawls are thrown out of engaging positions under conditions to be later described. Only once during each complete rotation of the shaft 18 forwardly can a pawl 75 engage with the teeth of its wheel; at other times each of the pawls 75 rides on the peripheral surface of the preceding number wheel.

After 9 forward movements of the units wheel the notch or recess 74 of the said wheel will be at the engaging position of the pawl of the tens wheel and the pawl of the said tens wheel will engage the teeth of the said wheel and will advance the wheel a distance of one tooth simultaneously with the advancing of the units wheel from 9 to 0. After 9 advances of the tens wheel the notch 74 of the said wheel will be at the engaging position of the pawl for the hundreds wheel and the said pawl will engage the teeth of the hundreds wheel and will move the same a distance of one tooth. The same is true concerning the thousands and the ten thousands wheel.

A bar 80 is secured to the pawl of the tens wheel, and the said bar extends over the pawl of the hundreds wheel far enough to prevent the pawl of the hundreds wheel from entering the notch of the tens wheel when the pawl of the tens wheel is riding on the periphery of the units wheel. The disks 27 before mentioned at the inner ends of the sleeves 24 are adjacent to the units wheel of the particular odometer upon whose shaft the disk is arranged and at the disk 27 the bar 80 of each series of pawls is provided with an angular lug or pawl 81.

It will be noticed from an inspection of Fig. 9 that each of the disks 27 has a recess 27ª in its periphery. This recess is of sufficient depth to receive the lug 81, as shown in Fig. 9 and when the lug is at the recess the pawls will take the position of Fig. 6, that is, the said pawls may engage with their respective number wheels. When however, the disk 27 is turned to bring the concentric portion thereof against the lug 81, that is, to bring the said lug out of the recess 27ª the bar 80 will be depressed to prevent the pawl of the hundreds wheel from moving the hundreds wheel under certain conditions, to be later described. A second bar 82 is secured to the pawls of the hundreds wheel in alinement with the bar 80 and the said bar 82 engages over or above the pawl of the thousands wheel. A third bar 83 is secured to the pawl of the thousands wheel and extends over or above the pawl of the ten-thousands wheel.

Whenever an odometer is in reading position at 62 or 62ª the arm 25 of the sleeve adjacent to the said odometer will be at the opening 26 and in position to be engaged by the operator to throw the said odometer into inoperative position. The odometers may be disconnected from their operating mechanism in succession by bringing each odometer into reading position, and moving the arm 25 to turn the disk 27 to bring the recess 27ª out of register with the lug 81. When now the rotation of the drum brings the operating mechanism past the said odometer the lug 81 will ride over the peripheral surface of the disk 27 and all of the pawls will be pressed downward to pass idly by the odometer without affecting the wheels thereof.

The bar 80 prevents upward movement of the pawl of the hundreds wheel, the bar 82 prevents upward movement of the thousands wheel and the bar 83 prevents upward movement of the ten-thousands wheel. Thus the bar 80 and its auxiliaries, the bars 82 and 83, permit any predetermined odometer to be disconnected and to remain idle until it is again thrown into operative position.

The bar 80 and its auxiliaries also serves another function, namely, to prevent over or excess movement of certain wheels when they are registering 9. When for instance, any odometer would register 19939 the notch of the hundreds wheel will be at the engaging position of the pawl for the tens wheel and the notch of the thousands wheel would also be at the engaging position of the pawl for the ten-thousands wheel. When now the operating mechanism passes this odometer the units wheel and the tens wheel will be moved to register 40. The notch of the tens wheel will be cut out of position for the pawl of the hundreds wheel and the said pawl will ride over the periphery of the tens wheel without moving the hundreds wheel. The notch or recess of the hundreds wheel will however, be in engaging position for the pawl of the thousands wheel and the notch of the thousands wheel will be in engaging position for the pawl of the ten-thousands wheel and the ten-thousands wheel and the thousands wheel will both be moved a distance of one notch so that the odometer will register 20940 instead of 19940. In the above instance, the bar 80 is prevented from holding down the hundreds, thousands and ten-thousands wheels because it must move the tens wheel. In every other instance however, the bar 80 will prevent over or excess movement of the wheels of the ten-thousands, thousands and hundreds wheels. For this reason the bar 82 is provided secured to the hundreds wheel and extending above the pawl of the thousands wheel. It is obvious that another combination of numbers will appear wherein the pawl of the hundreds wheel must move the hundreds wheel at the time when the thousands wheel has its notch in position to be engaged by the pawl of the ten-thousands wheel and the ten-thousands wheel would be moved to over register. To prevent this over or excess movement of the ten-thousands wheel the third bar 83 is connected to the pawl of the thousands wheel and extends over the ten-thousands wheel. The arrangement of the bars 80, 82 and 83 will insure the proper operation of every odometer with five number wheels.

Mechanism is also provided for resetting the several odometers, as they come into registering position. This mechanism comprises a clutch section 84 on the outer end of each shaft 18 and as each odometer comes into reading position the shaft 18 of the odometer comes into register and alinement with a stub shaft 85 journaled in the plate 51 before mentioned, and in an angle bracket 86 secured to the said plate. This shaft has a knurled wheel 87 secured thereto and extending through the opening 63 and the wheel and the shaft are movable longitudinally toward the shafts 18.

The inner end of the stub shaft 85 carries a clutch section for engaging the clutch section 84 of the adjacent shaft 18, and a coil spring 88 is provided for holding the shaft 85 and the wheel 87 in outward position. When it is desired to reset any odometer the odometer is brought to reading position and the shaft 85 is moved longitudinally to cause the clutch sections of the said shaft and the shaft 18 to engage. The knurled wheel is now turned in a direction to move all of the number wheels to register zero, after which the shaft 85 is permitted to be disengaged by the spring 88. It will be noticed that the opening 63 is of sufficient width to provide for the movement of the knurled wheel toward the odometer.

It will be evident from the description that with the improvement a registration may be made of the mileage of each tire, of the mileage made on the particular amount of fuel or oil, and there may be also made a record of each trip and of the total mileage for any predetermined length of time. In addition the four signal odometers will call attention to certain specific operations that must be performed in connection with the vehicle. In my prior application Serial No. 58,808 signal shutters are used in connection with a particular odometer and it is obvious that such shutters might be used with the four odometers used as signaling odometers.

The speedometer comprises a wheel or disk 89, which is provided on its periphery with indications 90, and the disk is secured to a shaft 91, which is journaled in the partition 7 before mentioned, and in a bearing 92 in an angle bracket 93, secured to the said partition. The shaft 91 is so arranged that the peripheral surface of the wheel or disk 89 is at the opening 61 before mentioned, and may be read through the said opening as shown in Fig. 1.

A hub or sleeve 94 is secured to the shaft 91 between the disk 89 and the partition 7, and this sleeve has a spiral groove 94ᵃ in its periphery. A rod or shaft 95 is mounted in an axial opening in the shaft 4 at the end adjacent to the disk 89, and the inner end of the said shaft is formed into a rack bar 96. At the opposite end from the rack bar the shaft or rod 95 has an angular portion 97 which engages within the groove 94 before mentioned.

A stop 98 is provided on the partition 7 to prevent movement of the angular portion 97 angularly with respect to the shaft or rod 95, and a centrifugal governor is connected with the rod 95 to move the same longitudinally in accordance with the speed of the vehicle or of the shaft 4. The said mechanism comprises angle levers 98, each of which is provided at one end with a weight 99 and at the other with a gear segment 100. The levers are pivoted between lugs 101 on the bearing plates 102 which are clamped on the shaft 4 and moved therewith. The segments 100 of the levers extend through longitudinal slots in the shaft 4 and engage the rack bar 96 of the rod 95. A coil spring 103 is arranged between the levers 98 and normally acts to draw the weights 99 toward the shaft 4.

When the shaft 4 begins to rotate the weights 99 will be thrown outward, and as the speed increases they will be moved farther away from each other. The rack bar 96 and the rod 95 will be moved toward the disk 89 and the angular lug 97 of the said shaft or rod will move in the groove 94 and will partially rotate the disk 89. The extent of the angle through which the disk is rotated will increase with an increase of speed and the disk by its angular movement will thus register the speed of the vehicle.

The operation of the device as a whole, is as follows:—When the shaft 4 is connected with a moving part of the vehicle as for instance, one of the wheels, the said shaft 4 will be rotated and the drum 28 will rotate therewith. For every complete rotation of the drum each odometer will be moved and the drum is geared to the moving part of the vehicle to rotate once for each mile traveled by the vehicle. At the same time the speedometer is registering the speed of the vehicle. If it should be desired to cut out any particular odometer, as for instance when one of the tires in use is replaced by an extra tire the odometer relating to the tire removed will be thrown out of gear by turning the disk 27 to bring the recess 82 thereof out of register with the lug 81, and the operating mechanism on the drum will then pass the said odometer without actuating the same. Meanwhile the odometer relating to the extra tire which replaces that removed will be thrown into gear, and the said odometer will register the mileage traveled by the extra tire. Any odometer may be thrown out of gear and left out of gear as long as desired or the odometer thrown out of gear may be reset to zero at once if desired.

The mechanism in connection with the ring 48 will rotate the cylindrical support carrying the odometers once through a complete rotation every twenty miles traveled by the vehicle bringing thus in succession each odometer past the reading openings 62 and 62ᵃ. Should the driver desire to consult any particular odometer he may bring the said odometer into reading position by rotating the ring 54 until the identifying label 64 pertaining to the odometer is at the indicator 65. Any odometer may be reset when in reading position by means of the knurled wheel 87, and it also may be thrown into or out of gear when in reading position by means of the arm 25.

It will be understood instead of arranging the bars 80, 82 and 83 in the manner shown, each of the said bars might extend from its connection to overlie all of the pawls of the higher number wheels, that is, the three bars might be arranged parallel instead of in alinement.

In resetting the odometers the shaft 18 upon which the number wheels of the particular odometer are mounted, is turned in a direction to move the number wheels forward. The recesses in the number wheels and in the shafts 18 bear a certain definite relation to each other such that when the balls are engaged between the opposing surfaces of the wheels and shafts, all of the wheels will have their numbers in register. For instance, if the number naught of each wheel was at the recess which carries the ball when all of the balls were in engagement the naughts of all the number wheels in the series would be in alinement. Hence it is only necessary to turn the shaft forward until the balls lock on all the wheels and all the wheels will be turned to zero position.

The drum 10 is provided with an identifying label 125 at each odometer. It is also provided with an opening 126 through which the numbers on the odometer wheel may be viewed (see Fig. 1). These openings 126 are designed to be arranged in staggered relation, that is to say, for one odometer the label would appear as shown in Fig. 1 at the end 62 of the opening, while the numerals of the odometer would appear at the end 62ª. Adjacent odometers on either side would have the labels and the openings in reverse position. The operator may determine the odometers by observing the label opposite the opening 126, or he may determine the position of the odometer by means of the ring 54.

I claim:—

1. A device of the character specified, comprising a driving shaft adapted to be connected with a wheel of the vehicle, a cylindrical support journaled on the shaft, a plurality of series of odometers carried by the support, the series being at the opposite ends of the support and the members of one series alternating with the members of the other series, a drum journaled on the shaft within the support and having a driving connection between the shaft and the drum for rotating the drum, mechanism in connection with the drum at each series of odometers for operating the odometers in succession, a connection between the driving shaft and the cylindrical support for rotating the said support to bring the odometers in succession into reading position, and manually operated means for rotating the said support to bring any predetermined odometer into reading position, said means comprising a ring mounted to rotate and connected with the support to move the support at the same speed as the ring, said ring having identifying labels on its periphery for the several odometers, and a casing inclosing the support and the operating mechanism and having reading openings for the odometers extending diametrically of the ring, the ring being mounted to rotate on the casing, and said casing having an indicator for coöperating with the ring to indicate the particular odometer at reading position.

2. A device of the character specified, comprising a driving shaft adapted to be connected with a wheel of a vehicle, a cylindrical support journaled on the shaft, a plurality of series of odometers carried by the support, the series being at the opposite ends of the support and the members of one series of the support and the members of the other alternating with the members of the other series, a drum journaled on the shaft within the support and having a driving connection between the shaft and the drum for rotating the drum, mechanism in connection with the drum at each series of odometers for operating the odometers in succession, a connection between the driving shaft and the cylindrical support for rotating the said support to bring the odometers in succession into reading position, and manually operated means for rotating the said support to bring any predetermined odometer into reading position.

3. A device of the character specified, comprising a driving shaft adapted to be connected with a wheel of a vehicle, a cylindrical support journaled on the shaft, a series of odometers carried by the support, a drum journaled on the shaft within the support and having a driving connection between the shaft and the drum for rotating the drum, mechanism in connection with the drum for operating the odometers in succession, and a connection between the driving shaft and the cylindrical support for rotating the said support to bring the odometers in succession into reading position.

4. A device of the character specified, comprising a driving shaft adapted to be connected with the wheel of a vehicle, a support journaled on the shaft, a series of odometers carried by the support, means journaled on the shaft within the support for operating the odometers in succession, a driving connection between the said means and the shaft, a casing having a reading opening for the odometers and a driving connection between the shaft and the support for bringing the odometers in succession into reading position.

5. A device of the character specified, comprising a driving shaft adapted to be connected with the wheel of a vehicle, a support journaled on the shaft, a series of odometers carried by the support, means journaled on the shaft within the support, for operating the odometers in succession, a driving connection between the said means and the shaft, a casing having a reading opening for the odometers, a driving connection between the shaft and the support for bringing the odometers in succession into reading position, manually operated means for bringing the odometers in succession into reading position, said means comprising a ring mounted to rotate and having a driving connection with the support, and having identifying labels identified with the odometers, and a fixed indicator coöperating with the ring.

6. A device of the character specified, comprising a driving shaft adapted to be connected with the wheel of a vehicle, a support journaled on the shaft, a series of odometers carried by the support, means journaled on the shaft within the support for operating the odometers in succession, a driving connection between the said means and the shaft, a casing having a reading opening for the odometers, a driving connection between the shaft and the support for bringing the odometers in succession into reading position, and manually operated means for bringing the odometers in succession into reading position.

7. A device of the type described comprising a plurality of odometers and means for actuating the odometers in succession.

8. A meter comprising a series of odometers and means for actuating the odometers intermittently and in succession.

9. A meter comprising a series of individual odometers spaced apart about a common center, and a common means rotatable on an axis through said common center for operating said odometers successively.

10. A meter comprising a power shaft, a series of odometers arranged concentrically about said power shaft, means carried by said power shaft for actuating said odometers in succession, and means for putting any odometer out of operative relation with the common actuating means.

11. A meter comprising a power shaft, a plurality of odometers mounted concentrically about said power shaft, and means disposed within the circle of said concentrically mounted odometers, and actuated by said power shaft for actuating said odometers in succession.

12. A meter comprising a power shaft, a drum mounted for rotation about the axis of the power shaft, a plurality of odometers disposed concentrically of said power shaft and externally to said drum, and means carried by the drum for operating said odometers in succession.

13. A meter comprising a power shaft, a drum mounted for rotation about the axis of the power shaft, a plurality of odometers disposed concentrically of said power shaft and externally to said drum, and means carried by the drum for operating said odometers in succession, said last named means comprising a series of spring pressed pawls, arranged to engage the odometers in succession.

14. A meter comprising a power shaft, a drum mounted for rotation about the axis of the power shaft, a plurality of odometers disposed concentrically of said power shaft and externally to said drum, and means carried by the drum for operating said odometers in succession, said last named means comprising a series of spring pressed pawls, arranged to engage the odometers in succession, and means for preventing engagement of the spring pressed pawls with the odometers at will.

15. A meter comprising a power shaft, a drum mounted for rotation about the power shaft, means connected with the power shaft for rotating the drum, a support mounted for rotation about the power shaft, a series of odometers carried by said support, and means carried by the drum for engaging the odometers in succession to actuate them.

16. A meter comprising a power shaft, a drum mounted for rotation about the power shaft, means connected with the power shaft for rotating the drum, a support mounted for rotation about the power shaft, a series of odometers carried by said support, means carried by the drum for engaging the odometers in succession to actuate them, and means for manually rotating the support with respect to the drum.

17. A meter comprising a power shaft, a drum mounted for rotation about the power shaft, means connected with the power shaft for rotating the drum, a support mounted for rotation about the power shaft, a series of odometers carried by said support, means carried by the drum for engaging the odometers in succession to actuate them, means for manually rotating the support with respect to the drum, said last named means comprising a gear ring mounted concentrically of the power shaft and arranged to engage a portion of the support to rotate the latter.

18. In a meter, the combination of a power shaft, a drum mounted concentrically of the shaft and rotatable with respect thereto, means including a series of gears for transmitting the movement of the shaft to the drum, a rotatable frame mounted concentrically of the shaft, a plurality of odometers carried by said rotatable frame, said rotatable frame being movable with respect to the drum, means carried by the drum for actuating said odometers, means for transmitting the power of the shaft to the rotatable frame for rotating the same, and additional means for manually rotating the frame to bring it to a desired position.

MARVIN SMITHEY.